(12) United States Patent
Katou et al.

(10) Patent No.: US 9,869,888 B2
(45) Date of Patent: Jan. 16, 2018

(54) OPTICAL MODULATOR

(71) Applicant: SUMITOMO OSAKA CEMENT CO., LTD., Tokyo (JP)

(72) Inventors: Kei Katou, Tokyo (JP); Norikazu Miyazaki, Tokyo (JP); Ryo Shimizu, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/468,118

(22) Filed: Mar. 24, 2017

(65) Prior Publication Data

US 2017/0276975 A1  Sep. 28, 2017

(30) Foreign Application Priority Data

Mar. 25, 2016 (JP) .................. 2016-061201

(51) Int. Cl.
  *G02F 1/01*   (2006.01)
  *G02F 1/03*   (2006.01)
  *G02F 1/225*  (2006.01)
  *G02F 1/21*   (2006.01)

(52) U.S. Cl.
  CPC .......... *G02F 1/0327* (2013.01); *G02F 1/0322* (2013.01); *G02F 1/225* (2013.01); *G02F 2001/212* (2013.01); *G02F 2201/58* (2013.01)

(58) Field of Classification Search
  CPC ...... G02F 1/225; G02F 2001/212; G02F 1/01; G02F 1/035; G02F 1/0327; G02B 6/12007
  See application file for complete search history.

(56) References Cited

U.S. PATENT DOCUMENTS 9,568,694 B2 * 2/2017 Mizobuchi ........... G02B 6/4279
2016/0011439 A1 * 1/2016 Kitamura ................ G02F 1/218
  385/2

FOREIGN PATENT DOCUMENTS

| JP | 2013-080009 | 5/2013 |
| JP | 2015-138145 | 7/2015 |
| JP | 2015-194517 | 11/2015 |
| JP | 2015197451 A | * 11/2015 |

* cited by examiner

*Primary Examiner* — Jennifer Doan
(74) *Attorney, Agent, or Firm* — JCIPRNET

(57) ABSTRACT

In an optical modulator, a light-receiving element (3a) that receives a light wave modulated in an optical modulation section (Ma) and a light-receiving element (3b) that receives a light wave modulated in an optical modulation section (Mb) are provided in a substrate. In addition, at least a part of an electrical line (4a) that guides a light-receiving signal output from the light-receiving element (3a) to an outer side of the substrate, and at least apart of an electrical line (4b) that guides a light-receiving signal form the light-receiving element (3b) to an outer side of the substrate are formed in the substrate. In addition, crosstalk suppression means (5), which suppress crosstalk between the electrical line (4a) and the electrical line (4b), is provided between the part of the electrical line (4a) and the part of the electrical line (4b) which are formed in the substrate.

3 Claims, 3 Drawing Sheets

OPTICAL MODULATOR

CROSS-REFERENCE TO RELATED APPLICATION

This application claims the priority benefit of Japan application serial no. 2016-061201, filed on Mar. 25, 2016. The entirety of the above-mentioned patent application is hereby incorporated by reference herein and made a part of this specification.

BACKGROUND OF THE INVENTION

Field of the Invention

The present invention relates to an optical modulator, and particularly, to an optical modulator including a substrate having an electro-optic effect, an optical waveguide that is formed in the substrate, and a modulation electrode for modulating a light wave that propagates through the optical waveguide.

Description of Related Art

In an optical communication field or an optical measurement field, various kinds of optical modulators such as an intensity modulator and a phase modulator, which includes a Mach-Zehnder type optical waveguide, have been used. An intensity variation of light, which is output from the Mach-Zehnder type optical waveguide, shows, for example, sinusoidal function characteristics with respect to a voltage that is applied to a modulation electrode. It is necessary to set a modulation signal, which is applied to the modulation electrode, to an appropriate operation bias point so as to obtain an optimal intensity of output light in accordance with a usage of the optical modulator.

According to this, in the related art, monitoring of an intensity state of output light of the optical modulator has been performed by detecting a part of an optical signal, which is output from the optical modulator, or radiated light that is radiated from a multiplexing section of the Mach-Zehnder type optical waveguide, as monitoring light with a light-receiving element such as an optical detector. In addition, an operation bias point of the modulation signal, which is applied to the modulation electrode, is adjusted (bias-controlled) on the basis of a detected value (monitoring output) of the light-receiving element.

With regard to the optical modulator as described above, various inventions have been suggested before now.

For example, Japanese Laid-open Patent Publication No. 2015-138145 discloses an optical modulator configured to enhance light-receiving sensitivity of the light-receiving element and to suppress a decrease in a frequency band of the light-receiving element even in a case where the light-receiving element is disposed on a substrate. In addition, Japanese Laid-open Patent Publication No. 2015-194517 discloses an optical modulator configured to suppress a decrease in a frequency band of a light-receiving element even in a case where two kinds of radiated light from the multiplexing section of the Mach-Zehnder type optical waveguide are simultaneously received and are monitored.

SUMMARY OF THE INVENTION

Along with the high capacity required for communications in recent years, an optical modulator having a structure, in which a plurality of optical modulation sections are provided in one substrate and optical modulation is performed by applying a modulation signal different for each of the optical modulation sections to the modulation electrode, has been developed. In addition, a multi-element structure optical modulator, which includes a plurality of substrates respectively provided with a plurality of optical modulation sections, has also been developed. The optical modulator has a configuration in which a plurality of light-receiving elements are disposed in each of the substrates and monitoring light is detected for each of the optical modulation sections so as to independently perform a bias control for a modulation signal in each of optical modulation sections.

In addition, an increase in frequency of a light-receiving band of a light-receiving element is in progress in accordance with an increase in communication speed. It is necessary to wire electrical lines, through which a light-receiving signal output from the light-receiving element propagates, as short as possible so as to secure a light-receiving band corresponding to the high-speed communication. However, when the electrical lines are shortly wired in a structure in which a plurality of the light-receiving elements are disposed on a substrate, the degree of freedom of wiring is small, and thus an interval between the electrical lines is likely to be narrow. In this case, electrical crosstalk is likely to occur in a portion at which the electrical lines are close and parallel to each other, and thus there is a concern that noise may be included in a light-receiving signal that propagates through the electrical lines.

The invention provides an optical modulator capable of minimizing noise such as electrical crosstalk from being incorporated into a light-receiving signal of a light-receiving element.

An optical modulator of the invention has the following technical characteristics.

(1) According to an aspect of the invention, there is provided an optical modulator including a substrate in which an optical waveguide is formed. The optical modulator includes at least a first optical modulation section and a second optical modulation section which modulate light waves which propagate through the optical waveguide. A first light-receiving element that receives a light wave that is modulated in the first optical modulation section, and a second light-receiving element that receives a light wave that is modulated in the second optical modulation section are disposed in the substrate. At least a part of a first electrical line that guides a light-receiving signal output from the first light-receiving element to an outer side of the substrate, and at least a part of a second electrical line that guides a light-receiving signal output from the second light-receiving element to an outer side of the substrate are formed in the substrate. Crosstalk suppression means, which suppresses crosstalk between the first electrical line and the second electrical line, is provided between the part of the first electrical line and the part of the second electrical line which are formed in the substrate.

(2) In the optical modulator according to (1), the crosstalk suppression means may be a metal member that is grounded.

(3) In the optical modulator according to (1) or (2), the second electrical line may be provided straddling the first electrical line at a portion at which the first electrical line and the second electrical line intersect each other.

The optical modulator according to the aspect of the invention includes a substrate in which an optical waveguide is formed. The optical modulator includes at least a first optical modulation section and a second optical modulation section which modulate light waves which propagate through the optical waveguide. A first light-receiving element that receives a light wave that is modulated in the first optical modulation section, and a second light-receiving element that receives a light wave that is modulated in the second optical modulation section are disposed in the substrate. At least a part of a first electrical line that guides a light-receiving signal output from the first light-receiving element to an outer side of the substrate, and at least apart of a second electrical line that guides a light-receiving signal output from the second light-receiving element to an outer side of the substrate are formed in the substrate. Crosstalk suppression means, which suppresses crosstalk between the first electrical line and the second electrical line, is provided between the part of the first electrical line and the part of the second electrical line which are formed in the substrate. Accordingly, it is possible to provide an optical modulator capable of minimizing noise such as electrical crosstalk from being incorporated into a light-receiving signal of the light-receiving element.

DETAILED DESCRIPTION OF THE INVENTION

Hereinafter, an optical modulator according to the invention will be described in detail.

Figure 1:
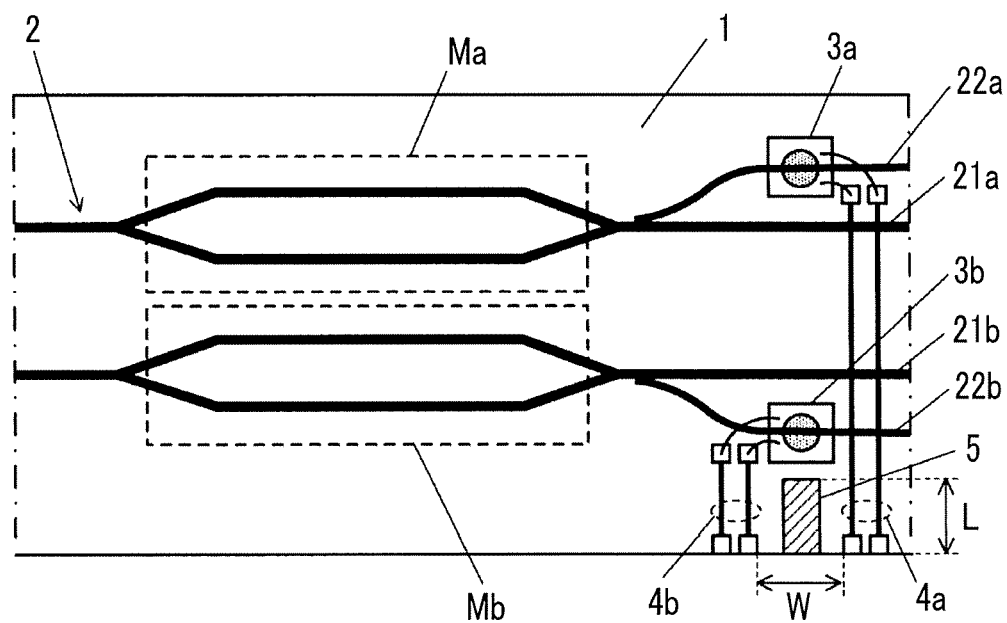
FIG. 1 is a plan view illustrating an example of an optical modulator according to the invention.

FIG. 1 is a plan view illustrating an example of the optical modulator according to the invention.

As illustrated in FIG. 1, the optical modulator of the invention relates to an optical modulator including a substrate 1 in which an optical waveguide 2 is formed. The optical modulator includes at least a first optical modulation section Ma and a second optical modulation section Mb which modulate light waves which propagate through the optical waveguide 2.

In the optical modulator, a first light-receiving element 3a that receives a light wave that is modulated in the first optical modulation section Ma, and a second light-receiving element 3b that receives a light wave that is modulated in the second optical modulation section Mb are disposed in the substrate 1. At least a part of a first electrical line 4a that guides a light-receiving signal output from the first light-receiving element 3a to an outer side of the substrate 1, and at least a part of a second electrical line 4b that guides a light-receiving signal output from the second light-receiving element 3b to an outer side of the substrate are formed in the substrate 1. Crosstalk suppression means 5, which suppresses crosstalk between the first electrical line 4a and the second electrical line 4b, is provided between the part of the first electrical line 4a and the part of the second electrical line 4b which are formed in the substrate 1.

Examples of the substrate 1 include a substrate such as quartz and a semiconductor in which an optical waveguide can be formed, and a substrate that has an electro-optic effect and uses any one single crystal in lithium niobate ($LiNbO_3$), lithium tantalate ($LiTaO_3$), and lead lanthanum zirconate titanate (PLZT), and the like.

For example, the optical waveguide 2, which is formed in the substrate 1, is formed by thermally diffusing a high-refractive-index material such as titanium (Ti) on a $LiNbO_3$ substrate (LN substrate). In addition, it is possible to use a rib-type optical waveguide in which a groove is formed on both sides of a portion that becomes an optical waveguide, or a ridge-type waveguide in which an optical waveguide portion is formed in a convex shape. In addition, the invention is also applicable to an optical circuit in which an optical waveguide is formed in substrates such as PLCs different from each other, and the substrates are joined and integrated.

A modulation electrode (not illustrated), which modulates a light wave that propagates through the optical waveguide 2, is provided in the substrate 1. The modulation electrode is constituted by a signal electrode or a ground electrode, and is formed by a gold plating method in which an electrode pattern of Ti and Au is formed on a substrate surface, and the like. In addition, a buffer layer such as dielectric $SiO_2$ may be provided on the substrate surface after forming the optical waveguide as necessary. Furthermore, when forming the buffer layer in a region that guides an optical signal, which propagates through the inside of the substrate 1 (optical waveguide 2), toward light-receiving element 3a and 3b, it is difficult to effectively guide the optical signal. Accordingly, it is preferable not to form the buffer layer in the region. In addition, in a case of disposing the light-receiving elements 3a and 3b through the buffer layer, it is preferable that the thickness of the buffer layer in the region in which the light-receiving elements 3a and 3b are disposed is made to be smaller than the thickness of other regions so as to secure light-receiving sensitivity.

The light-receiving elements 3a and 3b may be brought into direct contact with the optical waveguide 2, but it is preferable to form a high-refractive-index film on the optical waveguide 2 and to dispose the light-receiving elements 3a and 3b on the high-refractive-index film so as to effectively extract light (evanescent wave) that is radiated from the optical waveguide 2. In this case, it is necessary to set a refractive index of the high-refractive-index film to be higher than a refractive index of the optical waveguide 2 and lower than a refractive index of a light-receiving element substrate. In addition, for example, as disclosed in Japanese Laid-open Patent Publication No. 2013-80009, a groove or a reflective member may be disposed in the substrate 1 (or the optical waveguide 2 and the like), and a part of an optical signal may be guided to the light-receiving element side through reflection.

The optical modulator illustrated in FIG. 1 includes two optical modulation sections Ma and Mb which perform optical modulation by applying a modulation signal to the modulation electrode. The optical modulation sections Ma and Mb perform optical modulation by using modulation signals different from each other, and are configured to independently perform a bias control of the modulation signals.

Furthermore, optical modulation sections, which perform optical modulation by using modulation signals different from each other, are not limited to the optical modulation sections each being formed with one Mach-Zehnder type optical waveguide as illustrated in FIG. 1. That is, for example, it is possible to use optical modulation sections having various shapes such as an optical modulation section formed as a nest-type optical waveguide in which two Mach-Zehnder type optical waveguides are disposed in a nest shape, and an optical modulation section in which two nest-type optical waveguides are additionally disposed in a nest shape.

The light-receiving element 3a that receives a light wave modulated in the optical modulation section Ma, and the light-receiving element 3b that receives a light wave modulated in the optical modulation section Mb are disposed in the substrate 1. The light-receiving elements 3a and 3b detect a part of an optical signal that propagates each of output waveguides 21a and 21b of the optical modulation sections Ma and Mb and is output from the optical modulator as monitoring light. In this example, as the substrate 1, a substrate having a thickness of 20 μm or less is used, but the thickness of the substrate is arbitrarily set.

Furthermore, as will be described later with reference to FIG. 2, radiated light, which is radiated from a multiplexing section of each Mach-Zehnder type optical waveguide that constitutes the optical modulation sections Ma and Mb, may be detected as monitoring light. In addition, in a case where the substrate has a certain degree of thickness, it is also possible to employ a configuration in which the light-receiving elements 3a and 3b are buried in the substrate.

In the example illustrated in FIG. 1, the output waveguide 21a of the optical modulation section Ma is provided with a monitoring waveguide 22a that extracts a part of an optical signal that propagates through the output waveguide 21a. The monitoring waveguide 22a is formed to guide the optical signal extracted from the output waveguide 21a to the light-receiving element 3a.

In addition, the output waveguide 21b of the optical modulation section Mb is provided with a monitoring waveguide 22b that extracts a part of an optical signal that propagates through the output waveguide 21b. The monitoring waveguide 22b is formed to guide the optical signal extracted from the output waveguide 21b to the light-receiving element 3b.

That is, the light-receiving element 3a or 3b in the same drawing is configured to detect the part of the optical signal, which is modulated in the optical modulation section Ma or Mb, as the monitoring light. Furthermore, the light-receiving elements 3a and 3b may be disposed to respectively overlap the output waveguides 21a and 21b, and a groove or a reflective member may be provided in a part of a cross-section of the output waveguide. In this case, apart of an optical signal output from the output waveguide is directly extracted and is received by the light-receiving element.

A light-receiving signal, which is output from the light-receiving element 3a, is guided to an outer side of the substrate 1 through the electrical line 4a that is connected to the light-receiving element 3a. In addition, a light-receiving signal, which is output from the light-receiving element 3b, is guided to an outer side of the substrate 1 through the electrical line 4b that is connected to the light-receiving element 3b.

Figure 2:
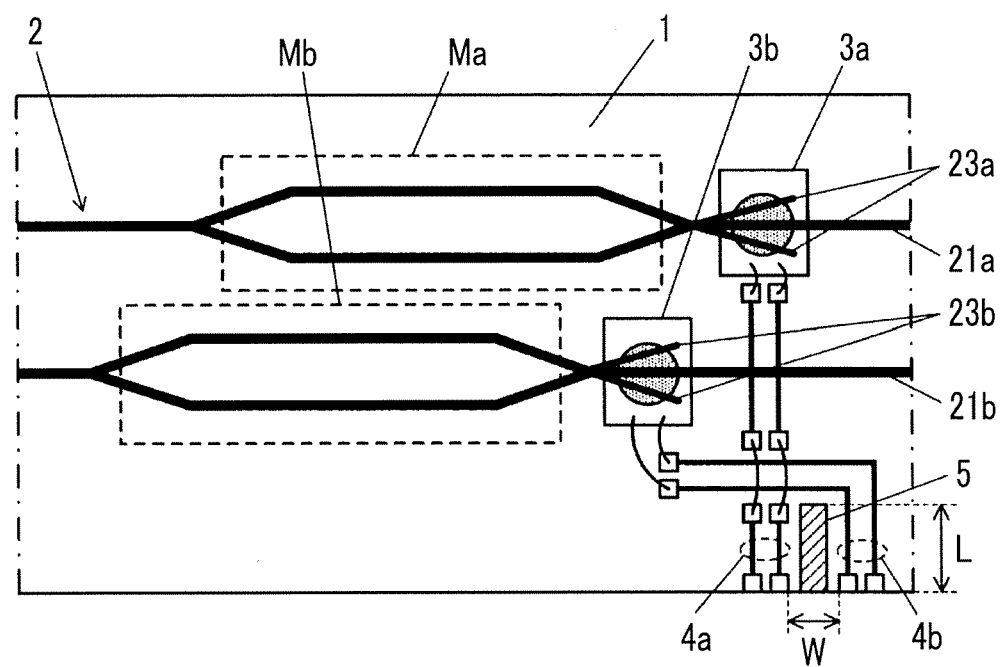
FIG. 2 is a plan view illustrating another example of the optical modulator according to the invention.

In the example illustrated in FIG. 1, the entirety of sections of the electrical lines 4a and 4b is formed on the substrate 1, but a partial section may be formed to be separated from the substrate 1 (for example, refer to FIG. 2).

The electrical lines 4a and 4b are formed with a wiring that is as short as possible so as to secure a light-receiving band of the light-receiving elements 3a and 3b. In this case, a section in which the electrical line 4a and the electrical line 4b are close and parallel to each other exists when considering arrangement of the light-receiving elements 3a and 3b, arrangement of output ports for light-receiving signals, and the like. In this section, there is a concern for electrical crosstalk between the electrical line 4a and the electrical line 4b, and thus a metal member 5 is provided as crosstalk suppression means. It is preferable that the metal member 5 is connected to a casing of the optical modulator and the like to be grounded.

As described above, in a section in which electrical lines connected to light-receiving elements different from each other are close and parallel to each other, when a grounded metal member is provided between the electrical lines, it is possible to suppress occurrence of crosstalk between the electrical lines, and thus it is possible to reduce noise of the light-receiving signal.

Furthermore, the crosstalk suppression means is not limited to a structure in which the grounded metal member is provided between the electrical lines, and it is possible to employ various structures capable of reducing crosstalk between the electrical lines. For example, even when employing a structure in which a groove is formed in a substrate portion between the electrical lines, it is possible to suppress electric fields of the electrical lines from having an effect on each other through the inside of the substrate, and thus it is possible to reduce crosstalk between the electrical lines.

FIG. 2 is a plan view illustrating another example of the optical modulator according to the invention.

In an example illustrated in FIG. 2, a radiated-light waveguide 23a, which guides radiated light that is radiated from the multiplexing section of the Mach-Zehnder type optical waveguide that constitutes the optical modulation section Ma, is provided on both sides of the output waveguide 21a of the optical modulation section Ma, and the light-receiving element 3a is disposed to cover the output waveguide 21a and the radiated-light waveguide 23a.

In addition, a radiated-light waveguide 23b, which guides radiated light that is radiated from the multiplexing section of the Mach-Zehnder type optical waveguide that constitutes the optical modulation section Mb, is provided on both sides of the output waveguide 21b of the optical modulation section Mb, and the light-receiving element 3b is disposed to cover the output waveguide 21b and the radiated-light waveguide 23b.

A low-refractive-index structure (structure having a refractive index lower than that of the output waveguide) is provided between each of the output waveguides 21a and 21b and each of the light-receiving elements 3a and 3b to suppress incidence of an optical signal, which propagates through the output waveguide, into each of the light-receiving elements. Examples of the low-refractive-index structure include a structure in which a film such as $SiO_2$ is disposed, a structure in which an air layer is interposed, and the like.

That is, the light-receiving elements 3a and 3b in the same drawing are configured to respectively detect radiated light from the optical modulation sections Ma and Mb as the monitoring light.

As the optical modulation sections Ma and Mb, it is possible to employ optical modulation sections having various shapes such as an optical modulation section formed with one Mach-Zehnder type optical waveguide, an optical modulation section formed as a nest-type optical waveguide in which two Mach-Zehnder type optical waveguides are disposed in a nest shape, and an optical modulation section in which two nest-type optical waveguides are additionally disposed in a nest shape.

A light-receiving signal, which is output from the light-receiving element 3a, is guided to an outer side of the substrate 1 through the electrical line 4a that is connected to the light-receiving element 3a. In addition, a light-receiving signal, which is output from the light-receiving element 3b, is guided to an outer side of the substrate 1 through the electrical line 4b that is connected to the light-receiving element 3b.

In the example illustrated in the same drawing, the electrical line 4a and the electrical line 4b are disposed to intersect each other, and the other electrical line (electrical line 4a) is formed straddling one electrical line (electrical line 4b) is formed at the intersecting portion.

As described above, when the electrical lines, which are respectively connected to the light-receiving elements different from each other, are allowed to three-dimensionally (spatially) interest each other, it is possible to reduce a section in which the electrical lines are close and parallel to each other. According to this, it is possible to suppress occurrence of crosstalk, and thus it is possible to reduce noise of a light-receiving signal.

Figure 3A:
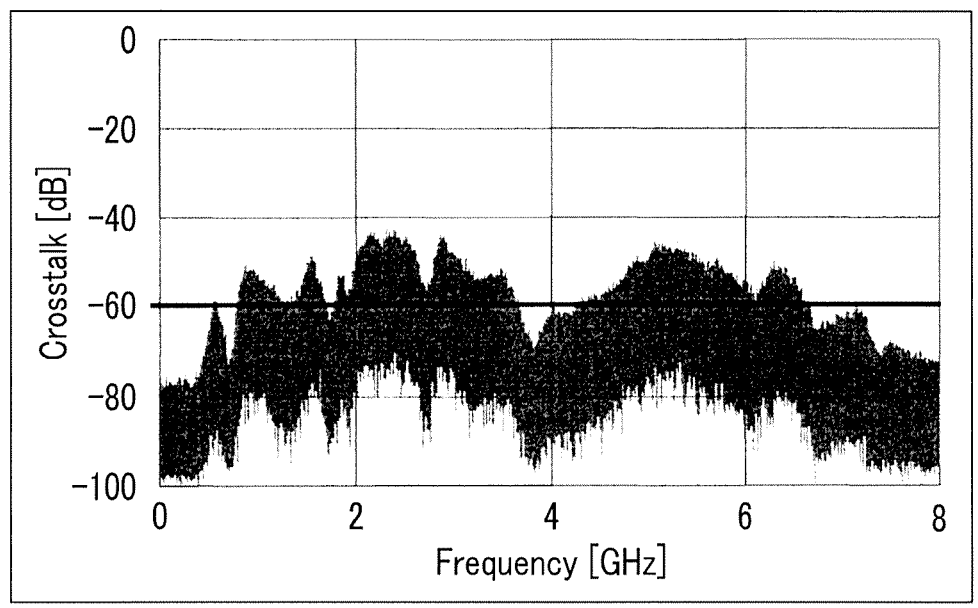
FIGS. 3A and 3B are views illustrating a noise removal effect in a light-receiving signal in the optical modulator according to the invention.
Figure 3B:
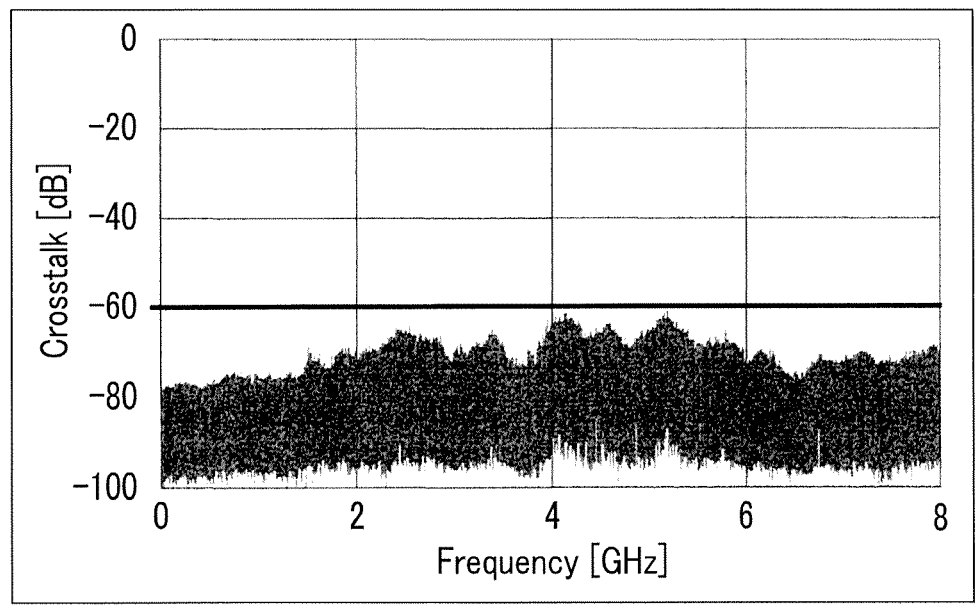

FIGS. 3A and 3B are views illustrating a nose removal effect in the light-receiving signal in the optical modulator according to the invention. FIG. 3A is a graph illustrating a measurement result of crosstalk in a case where the crosstalk suppression means is not provided, and FIG. 3B is a graph illustrating a measurement result of crosstalk in a case where the crosstalk suppression means is provided. In both of the graphs, the horizontal axis represents a frequency (GHz), and the vertical axis represents a crosstalk amount (dB). Here, a modulation signal is input to the modulation electrode, and the crosstalk amount between the light-receiving elements is evaluated by using an electrical spectrum analyzer (spectrum analyzer (R3267) manufactured by ADVANTEST CORPORATION). As is clear from FIGS. 3A and 3B, when the crosstalk suppression means is provided between the electrical lines which are close and parallel to each other, it can be seen that it is possible to effectively remove noise of the light-receiving signal.

It is effective that an interval W between the electrical lines is wider, and a parallel section length L is shorter so as to suppress crosstalk, but the present inventors have obtained the following finding. That is, when the interval W is 200 μm or greater and the section length L is 3 mm or less, it is possible to secure the minimum crosstalk amount necessary for a control of the optical modulator.

Here, description has been given of a configuration in which two optical modulation sections are provided on the substrate as an example, but it is also possible to employ a configuration in which three or greater optical modulation sections are provided on the substrate and light-receiving elements are provided in correspondence with the optical modulation sections. Even in this case, in a section in which electrical lines of the light-receiving elements are close and parallel to each other, the crosstalk suppression means may be provided between the electrical lines.

In addition, the invention is also applicable to a multi-element structure optical modulator including a plurality of substrates in which a plurality of optical modulation sections are provided.

Figure 4:
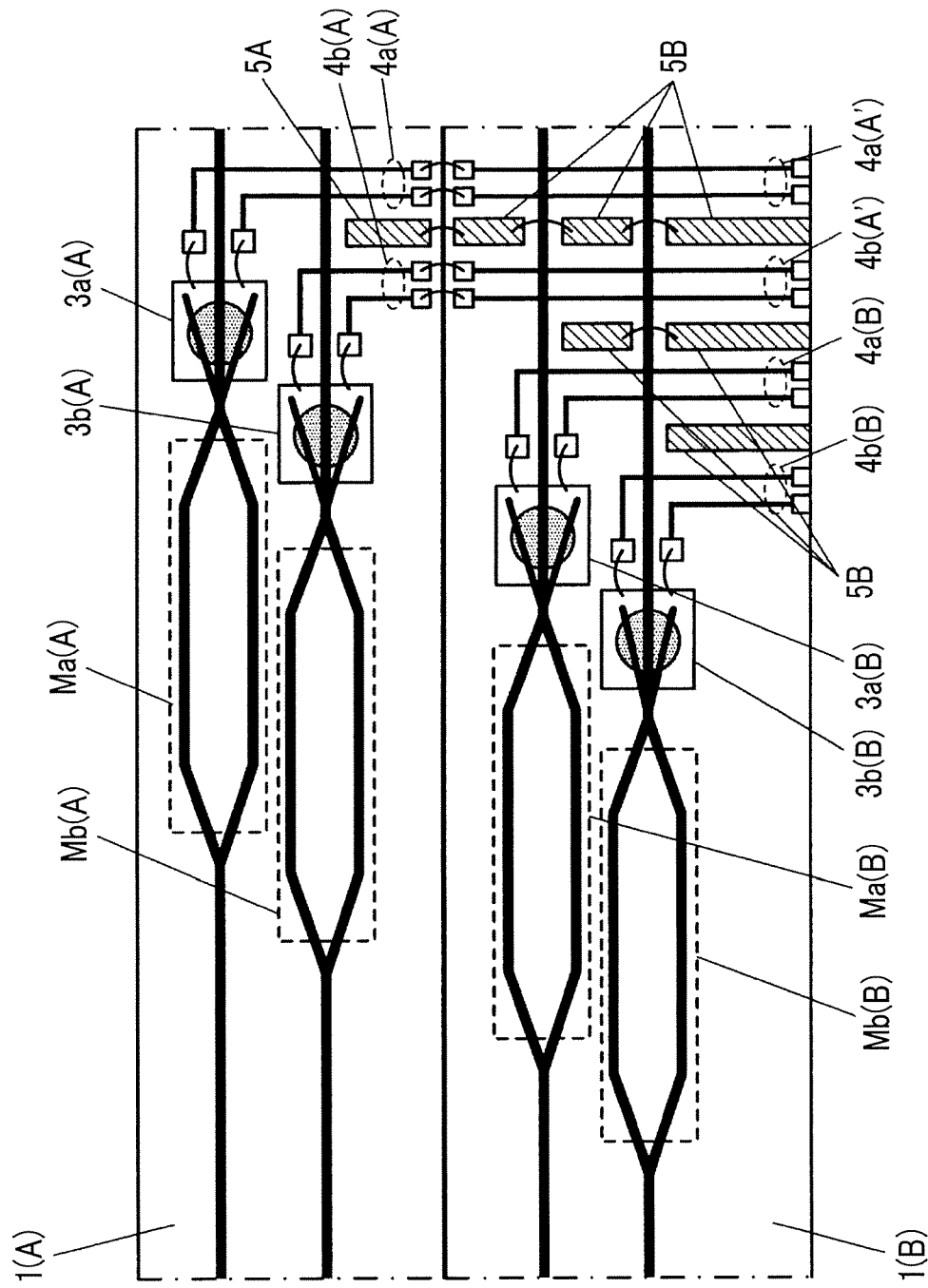
FIG. 4 is a plan view illustrating an example of a multi-element structure optical modulator according to the invention.

FIG. 4 is a plan view illustrating an example of the multi-element structure optical modulator according to the invention.

The optical modulator in the same drawing includes a first substrate 1(A) and a second substrate 1(B). The substrate 1(A) is provided with two optical modulation sections Ma (A) and Mb (A), a light-receiving element 3a(A) that receives a light wave that is modulated in the optical modulation section Ma(A), and a light-receiving element 3b(A) that receives a light wave that is modulated in the optical modulation section Mb(A). In addition, an electrical line 4a(A) that transmits a light-receiving signal output from the light-receiving element 3a(A) and an electrical line 4b(A) that transmits a light-receiving signal output from the light-receiving element 3b(A) are also formed in the substrate 1(A).

Similarly, substrate 1(B) is also provided with two optical modulation sections Ma(B) and Mb(B), a light-receiving element 3a(B) that receives a light wave that is modulated in the optical modulation section Ma(B), and a light-receiving element 3b(B) that receives a light wave that is modulated in the optical modulation section Mb(B). In addition, an electrical line 4a(B) that transmits a light-receiving signal output from the light-receiving element 3a(B) and an electrical line 4b(B) that transmits a light-receiving signal output from the light-receiving element 3b(B) are also formed in the substrate 1(B). In addition, an electrical line 4a(A') that relays a light-receiving signal output from the light-receiving element 3a(A) in the substrate 1(A), and an electrical line 4b(A') that relays a light-receiving signal output from the light-receiving element 3b(A) in the substrate 1(A) are also formed in the substrate 1(B).

That is, the light-receiving signals from the light-receiving elements 3a (A) and 3b (A) in the substrate 1(A) are guided from the electrical lines 4a (A) and 4b (A) to an outer side of the substrate through the electrical lines 4a(A') and 4b (A') of the substrate 1(B).

In a section in which the electrical lines 4a (A) and 4b (A) provided in the substrate 1(A) are close and parallel to each other, as an example of the crosstalk suppression means, a metal member 5A is provided between the electrical lines to suppress electrical crosstalk. In addition, in a section in which the electrical lines 4a (A') and 4b (A'), and 4a (B) and 4b (B) provided in the substrate 1(B) are close and parallel to each other, as an example of the crosstalk suppression means, a metal member 5B is also disposed between the electrical lines to suppress electrical crosstalk.

According to the above-described configuration, in the multi-element structure optical modulator, it is possible to suppress electrical crosstalk when transmitting a light-receiving signal of a light wave that is modulated in each of the optical modulation sections in a substrate, and it is also possible to suppress electrical crosstalk when relaying a light-receiving signal that is obtained in other substrate. In the multi-element structure, the electrical lines with respect to the light-receiving elements are parallel to each other as illustrated in FIG. 4, and the length of the electrical lines are also lengthened. Accordingly, as an improvement of crosstalk, the crosstalk suppress means (metal members 5A and 5B in FIG. 4) is very effective.

In the multi-element structure optical modulator, the optical modulation sections may be provided in more substrates. In a case where light waves having wavelengths different from each other are optically modulated in the optical modulation sections in the substrates, it is needless to say that the crosstalk prevention effect due to the crosstalk suppression means increases.

Furthermore, as the optical modulation sections, it is possible to employ optical modulation sections having various shapes such as an optical modulation section formed with one Mach-Zehnder type optical waveguide, an optical modulation section formed as a nest-type optical waveguide in which two Mach-Zehnder type optical waveguides are disposed in a nest shape, and an optical modulation section in which two nest-type optical waveguides are additionally disposed in a nest shape. In this case, the light-receiving element may be provided for not only a main modulation section that is constituted by a Mach-Zehnder type optical waveguide on an outer side but also a sub-modulation section that is constituted by a Mach-Zehnder type optical waveguide on an inner side. In this structure, the number of the light-receiving elements increases, and the number of the electrical lines also increase in accordance with the increase in the number of the light-receiving elements. Accordingly, it is very effective to provide the crosstalk suppression means becomes very effective.

Hereinbefore, the invention has been described on the basis of examples. However, the invention is not limited to the above description, and it is needless to say that appropriate design modifications can be made in a range not departing from the gist of the invention.

As described above, according to the invention, it is possible to provide an optical modulator capable of minimizing noise such as electrical crosstalk from being incorporated into a light-receiving signal of a light-receiving element.

What is claimed is:

1. An optical modulator, comprising:
    a substrate in which an optical waveguide is formed,
    wherein the optical modulator includes at least a first optical modulation section and a second optical modulation section which modulate light waves which propagate through the optical waveguide,
    a first light-receiving element that receives a light wave that is modulated in the first optical modulation section, and a second light-receiving element that receives a light wave that is modulated in the second optical modulation section are disposed in the substrate,
    at least a part of a first electrical line that guides a light-receiving signal output from the first light-receiving element to an outer side of the substrate, and at least a part of a second electrical line that guides a light-receiving signal output from the second light-receiving element to an outer side of the substrate are formed in the substrate, and
    crosstalk suppression means, which suppresses crosstalk between the first electrical line and the second electrical line, is provided between the part of the first electrical line and the part of the second electrical line which are formed in the substrate.

2. The optical modulator according to claim 1, wherein the crosstalk suppression means is a metal member that is grounded.

3. The optical modulator according to claim 1, wherein the second electrical line is provided straddling the first electrical line at a portion at which the first electrical line and the second electrical line intersect each other.

* * * * *